No. 790,569. PATENTED MAY 23, 1905.
A. F. HEMINGWAY.
ELECTRIC MACHINE.
APPLICATION FILED AUG. 15, 1904.
2 SHEETS—SHEET 1.
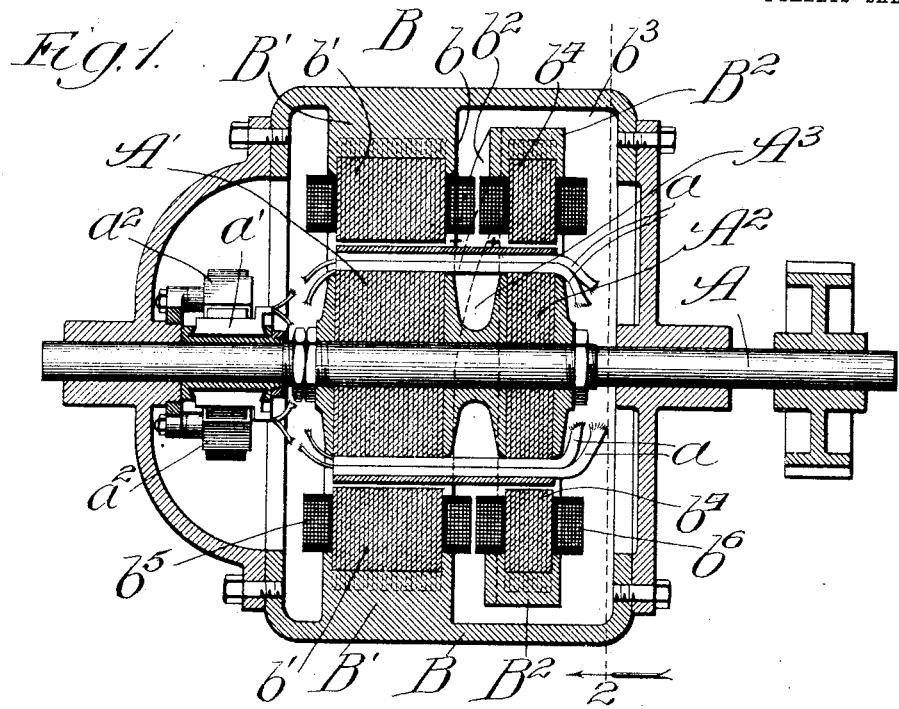
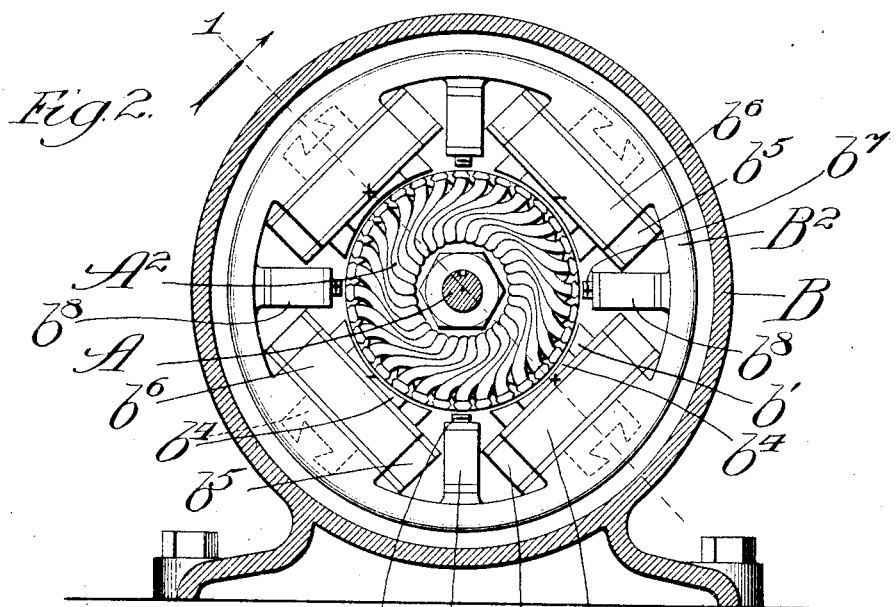
Witnesses:
Chas. E. Gaylord
John Enders
Inventor:
Albert F. Hemingway,
By Dyrenforth, Dyrenforth & Lee,
Attys.

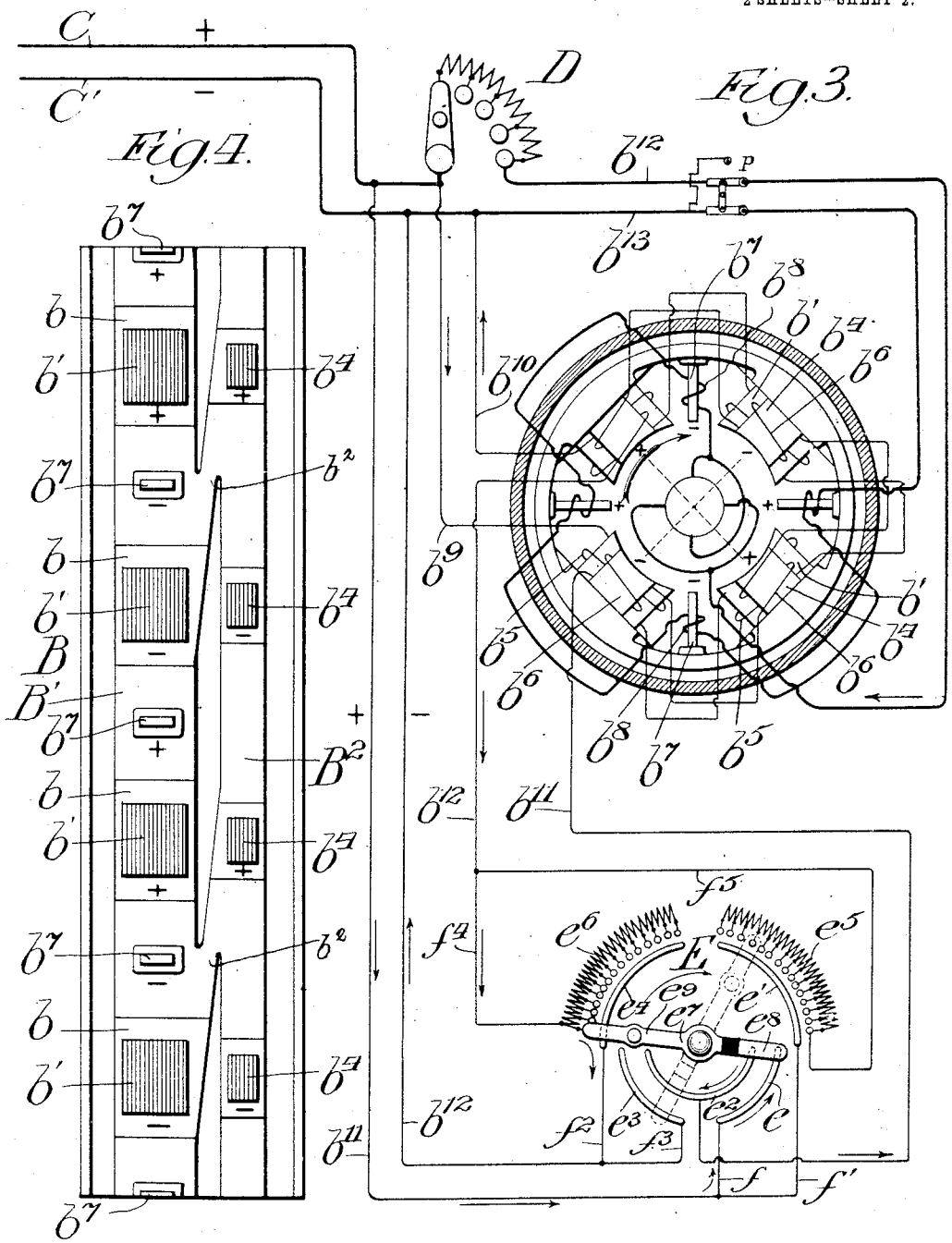

No. 790,569.                                                                 Patented May 23, 1905.

UNITED STATES PATENT OFFICE.

ALBERT F. HEMINGWAY, OF CHICAGO, ILLINOIS, ASSIGNOR OF ONE-HALF TO JOHN R. MARKLE, OF CHICAGO, ILLINOIS.

ELECTRIC MACHINE.

SPECIFICATION forming part of Letters Patent No. 790,569, dated May 23, 1905.

Application filed August 15, 1904. Serial No. 220,783.

*To all whom it may concern:*

Be it known that I, ALBERT F. HEMINGWAY, a citizen of the United States, residing at 706 East Forty-second street, Chicago, in the county of Cook and State of Illinois, have invented a new and useful Improvement in Electric Machines, of which the following is a specification.

My invention pertains particularly to electric motors and dynamos; and my primary object is to provide an electric machine which may be employed as a variable-speed motor which may be operated at different speeds through a much greater range than has heretofore been possible, while maintaining practically a constant power, or as a dynamo which may be operated to produce currents of variable electromotive force through a wide range.

It is understood by those skilled in the art that the speed of a motor varies inversely with the effective magnetic flux affecting the armature of the motor, and this principle has been recognized in designing motors for constant speed and in some degree in providing for a variable-speed motor. So far as I am aware, however, no feasible construction has been devised heretofore for enabling commutation to be effected under conditions which would enable the required current to be employed to maintain the power under different rates of speed through a wide range.

My invention not only provides an economical construction for motors having a speed range equal to the greatest now known, but it also provides economically for a far greater speed range than is possible with the best machine of known constructions. Incidentally I provide in a new combination the means for making the neutral plane the commutating-plane in the improved machine, enabling the machine to be used as a reversible motor throughout its wide range of speed without the necessity of shifting the commutator-brushes. Theoretically an exceedingly wide range in speed should be obtainable in the improved motor without encountering commutating difficulties which would prevent the use of enough current to maintain the horsepower, and practically a ratio of one to eight or of one to ten between minimum and maximum speeds without change in power seems easily attainable.

In carrying out my invention I provide both a constant or main field and an auxiliary variable field for the armature, the latter field being in practice always of less strength than the former, and I arrange the poles of the two fields in longitudinal alinement with respect to the armature and give a smaller polar embrace at the variable than at the constant field. The variable field may be reversed, so that it will act with or against the main field, as desired.

The invention is illustrated in one embodiment in the accompanying drawings, in which—

Figure 1 represents a longitudinal section of a multipolar motor constructed in accordance with my invention; Fig. 2, a section taken as indicated at line 2 of Fig. 1; Fig. 3, a view diagrammatic in its nature, illustrating the circuits and controller employed; and Fig. 4, a development of the field frame and cores, illustrating the preferred manner of supporting the ring pertaining to the auxiliary field.

A description of the invention when embodied in a multipolar motor is as follows:

A represents an armature-shaft carrying an armature having a relatively large core-section $A'$, corresponding with the main field, and a relatively small core-section $A^2$, corresponding with the auxiliary field, said sections being magnetically separated in part by a channeled spacing-ring $A^3$; B, a combination frame and casing containing rings $B'$ $B^2$, equipped with poles corresponding with the armature-sections $A'$ $A^2$, respectively; C C', the conductors or mains through which current is supplied to the motor; D, a starter containing the necessary resistance for admitting the current to the armature, and E a controller by means of which the auxiliary field may be varied or reversed at will.

The armature may have its coils $a$ pass about its entire length and connect with the commutator-bars $a'$, or any other suitable winding may be employed. The usual brushes $a^2$ may be employed, and in the construction shown these brushes should be set at the neutral planes with respect to the main field-poles. The armature-core may be of any suitable construction, although it is preferred to introduce an air-space, as shown. The ring $A^3$ may be of cast-iron of low magnetic conductivity.

The frame B may be of any suitable construction. It is preferred, however, to employ a casing and provide the ring B' and bosses $b$ thereon for receiving the poles $b'$ of the main field. The ring $B^2$ is preferably supported by diagonal ribs or webs $b^2$, branching from the ring B', said ring $B^2$ being separated by an air-space $b^3$ from the inner surface of the casing. The ring $B^2$ is equipped with poles $b^4$ of less polar embrace than are the poles $b'$. The poles $b'$ are equipped with coils $b^5$, and the poles $b^4$ are equipped with coils $b^6$. At the neutral planes with respect to the poles of the main and auxiliary fields are arranged the small poles $b^7$ of commutating coils $b^8$. These poles $b^7$ project from the ring $B^2$, as clearly indicated in Fig. 4.

The coils $b^5$ of the main field are shown connected in shunt through wires $b^9$ $b^{10}$. The main field may be connected in any desired manner, however. The coils $b^6$ of the auxiliary field are shown connected in shunt through wires $b^{11}$ $b^{12}$, connected with the reverser and controller E, and this is the proper method of connecting said coils, unless a modified result is desired. The commutating coils $b^8$, whose function is to bring the commutating planes into coincidence with the neutral planes, thereby rendering the motor reversible without shifting of brushes, are connected in series with the armature, current being supplied through conductors $b^{12}$ $b^{13}$.

The controller E is provided with ring sections $e, e', e^2, e^3$, and $e^4$, resistance-coils $e^5 e^6$ parallel with the ring sections $e' e^4$, respectively, and a pivoted switch-lever $e^7$, having electrically-separated sections $e^8 e^9$. The controller is interposed in the course of the wires $b^{11}$ $b^{12}$, one section of the wire $b^{11}$ being joined by branches $f f'$ with the ring sections $e e'$, respectively, and the other section of the wire $b^{11}$ being joined directly to the ring section $e^2$, and one section of the wire $b^{12}$ being joined by branches $f^2 f^3$ with the ring sections $e^4 e^3$, respectively, and the other section of the wire $b^{12}$ by branches $f^4 f^5$ with the advance and rear ends, respectively, of the coils $e^6 e^5$, respectively.

From the foregoing detailed description the operation will be readily understood. The switch at the starter D may be moved to cut out resistance and admit full current to the armature. The manually-controlled switch at the controller E may be moved from the position shown in full lines to cut in resistance at the coil $e^6$, thereby weakening the auxiliary field. The movement may be continued till the switch reaches the dotted position, when the current through the coils $b^6$ will be reversed, so that the magnetic flux through the poles $b^4$ will become opposed to that through the poles $b'$. Further movement of the switch will cut out resistance at $e^5$, thereby increasing the reverse current. By reference to Fig. 4 it will be observed that the ring $B^2$ is carried by the diagonal ribs $b^2$ in such a manner that if there is any leakage of magnetism from one field to the other it will be in a channel which will produce a useful result—that is, in a course cutting the armature-coils. Thus the adjacent pole-pieces of the two fields are separated by air-spaces, and where magnetism passes through the ribs $b^2$ it completes a useful course through the armature.

Those skilled in the art will readily understand that the effect of weakening the auxiliary field is to increase the speed of the motor and that the reversal of the magnetic flux in the auxiliary field results in still further weakening the effective (differential) magnetism acting upon the armature, thereby still further increasing the speed of the motor. Inasmuch as the polar embrace at the poles $b^4$ is relatively small and the poles $b^4$ have their central planes longitudinally of the machine coincident with the corresponding planes of the poles $b'$, it is evident that the commutation will not be seriously affected by varying the strength of the auxiliary field, and since the magnetism of the poles $b^7$ of the commutating coils acts always with the magnetism of the entering tips of the adjacent poles $b'$, regardless of the direction of rotation of the armature, (assuming, of course, that when the motor is reversed the armature-current is reversed,) it is evident that the neutral plane, with respect to the main and auxiliary fields, is also the commutating plane, regardless of the direction of rotation of the motor. Hence the motor may be reversed without changing the position of the brushes. I have shown a reversing-switch P interposed in the course of the conductors $b^{12}$ $b^{13}$.

To those familiar with the practical construction of motors it will be evident that my improved motor can be constructed at but little more cost than a motor of the same power of non-changeable speed, regardless of the range of speed for which the motor is designed. The motor will in practice be designed to have the required power at low speed, and in this connection it should be observed that since the field effects are added at low speed no considerable extra cost attaches to the construction other than that incidental to the work of winding the separate cores. Moreover, it will be seen that the range in speed is dependent upon the relative capacities of the two fields. In practice the auxiliary field will have a smaller flux than the main field, and except when the auxiliary-field current is at maximum strength in either direction the core of said field is not saturated, whereas under proper conditions of design the core of the main field is always saturated.

It will be understood that my improved machine may be advantageously employed as a dynamo for the purpose of obtaining a variable electromotive force within wide limits of range by varying the field strength, it being recalled that the electromotive force developed varies directly with the effective magnetic flux. Obviously the desired result may be obtained, the machine being free from commutating difficulties, as will be understood without further explanation.

Changes in details of construction are contemplated, it being feasible, for instance, to vary the armature and frame construction, as suggested. Hence no undue limitation should be understood from the foregoing detailed description.

In practice any suitable arrangement of the starter and speed-controller may be employed.

What I regard as new, and desire to secure by Letters Patent, is—

1. In a machine of the character set forth, the combination of an armature, main fields influencing the same and having poles of given polar embrace presented thereto, auxiliary fields influencing the armature and having poles of smaller polar embrace presented thereto and in alinement with said first-named poles, and a controller serving to vary the current in the auxiliary field, for the purpose set forth.

2. In a machine of the character set forth, the combination of an armature, main fields influencing the same and having poles of given polar embrace presented thereto, auxiliary fields influencing the armature and having poles of smaller polar embrace presented thereto and in alinement with said first-named poles and manual means for varying the strength of the auxiliary field, for the purpose set forth.

3. The combination of an armature, a main field having a core and suitable windings therefor and having poles of given embrace presented to the armature at one portion of its length, an auxiliary field with a shunt-winding and with poles of relatively small embrace presented to the armature at another point in its length and in longitudinal alinement with the poles of the main field, and means for varying the current in the coils of the auxiliary field, substantially as and for the purpose set forth.

4. The combination of an armature, a frame provided with two rings carrying poles, the poles at one ring having a relatively small embrace, means for exciting the poles of larger embrace, means for exciting the poles of smaller embrace, and manual means for varying the excitation of the poles of smaller embrace, for the purpose set forth.

5. The combination of an armature, a frame carrying rings equipped with poles in longitudinal alinement with each other, the rings being magnetically separated at adjacent poles of the two rings, constantly-excited field-coils for one magnetic circuit, and variably-excited coils for the other magnetic circuit with means for manually controlling the variation of the excitation at said last-named coils, substantially as and for the purpose set forth.

6. A frame for a machine of the character set forth, comprising a ring equipped interiorly with poles, and a second ring equipped interiorly with poles in alinement with said first-named poles, said second-named ring supported by diagonal ribs joining the poles of the two rings in alternation, the second-named ring being otherwise magnetically insulated, substantially as and for the purpose set forth.

7. The combination of an armature, a main field having poles of given embrace presented to the armature at one portion of its length, means for maintaining a substantially constant current in the main field, an auxiliary field having poles of less embrace presented to the armature at another portion of its length and in alinement with said first-named poles, and a controller serving to vary the strength of or reverse the auxiliary field, at will, for the purpose set forth.

8. The combination of an armature, a main field having poles of given embrace, an auxiliary variable field having poles of lesser embrace suitably spaced with relation to said first-named poles and in alinement therewith, and relatively small poles located between the poles of the main field and equipped with coils connected in series with the armature, said last-named coils serving in establishing the commutating plane at the neutral plane, for the purpose set forth.

ALBERT F. HEMINGWAY.

In presence of—
L. HEISLAR,
WALTER N. WINBERG.